No. 759,618. PATENTED MAY 10, 1904.
J. KORBEL.
DOUGHNUT FRIER AND DRAINER.
APPLICATION FILED SEPT. 1, 1903.
NO MODEL.
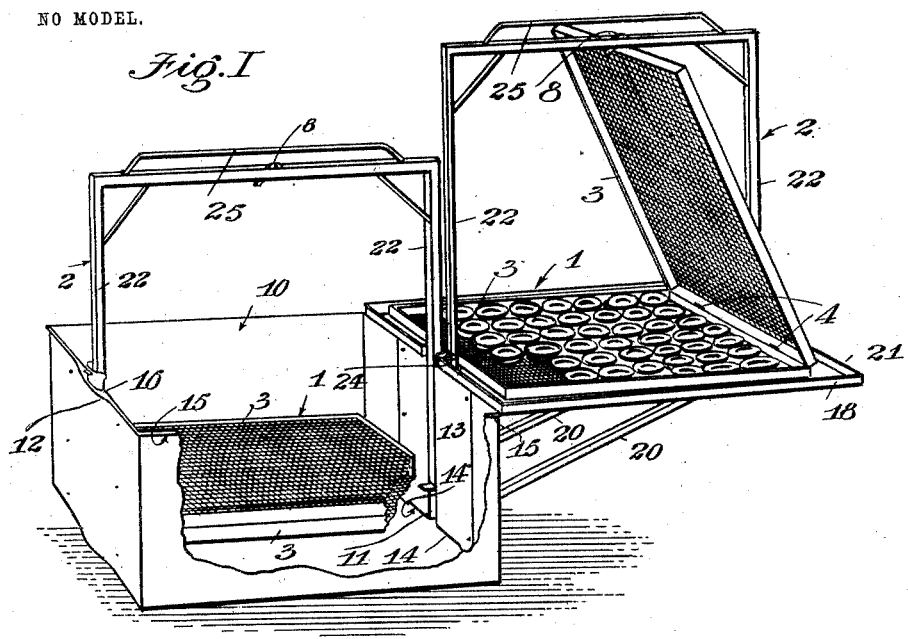
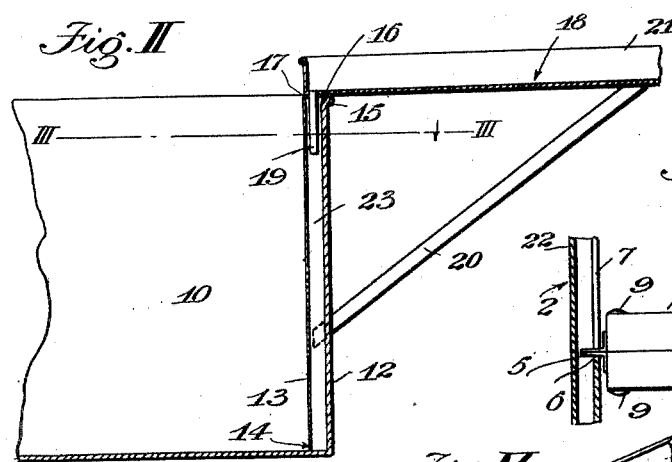
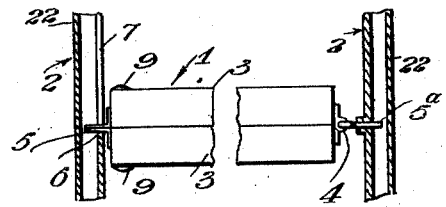
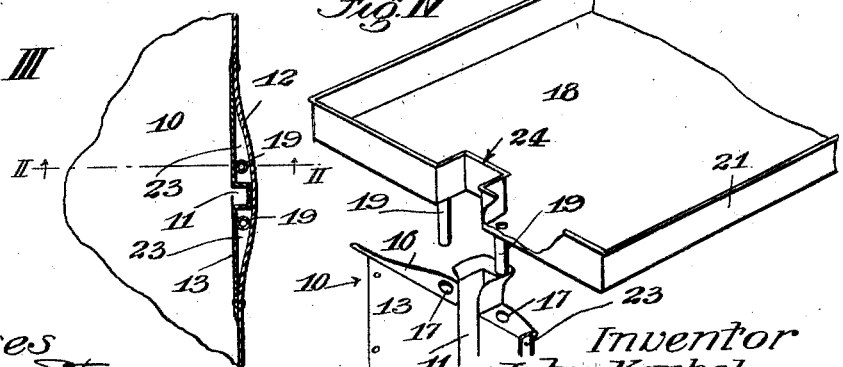
Witnesses
Inventor
John Korbel
by Townsend Bros.
his attys.

No. 759,618. Patented May 10, 1904.

UNITED STATES PATENT OFFICE.

JOHN KORBEL, OF LOS ANGELES, CALIFORNIA.

DOUGHNUT FRIER AND DRAINER.

SPECIFICATION forming part of Letters Patent No. 759,618, dated May 10, 1904.

Application filed September 1, 1903. Serial No. 171,470. (No model.)

*To all whom it may concern:*

Be it known that I, JOHN KORBEL, a citizen of the United States, residing at Los Angeles, in the county of Los Angeles and State of California, have invented new and useful Improvements in Doughnut Friers and Drainers, of which the following is a specification.

This invention relates to improvements on the doughnut or fried-cake turner disclosed and claimed in my Patent No. 616,420, dated December 20, 1898.

The main object of the present invention is to provide means for draining back into the cooking-kettle the oil or grease that runs off from the cake-holder when it is removed from the kettle.

Another object of my invention is to provide for detachability of the drainage means from the kettle.

Further objects of my invention will appear in and from the following description and claims.

The accompanying drawings illustrate the invention.

Figure I is a perspective view of the combined cooking and draining device, partly broken away to more clearly disclose the interior construction. Fig. II is a vertical section of part of the device on the line II II in Fig. III. Fig. III is a horizontal section on the line III III in Fig. II. Fig. IV is a perspective of adjacent portions of the tray and cooking vessel. Fig. V is a broken sectional elevation of the cake-holder and its supporting-frame.

The cake-holder and its supporting-frame 2 are or may be substantially the same as in my previous patent above referred to. The cake-holder 1 comprises two foraminous members 3, hinged together at 4 and adapted to hold the doughnuts or other cakes between them, pivots 5 5ª being provided at opposite ends of the cake-holder to provide for support and rotation in the frame 2. Pivot 5 is divided, one-half being attached to each member 3, and a pivot-seat 6 is formed in one of the vertical bars 22 of frame 2, the pivot 5 seating therein and the upper part of such pivot being movable upward in a slot 7, extending upwardly from said pivot-seat. A catch 8 is provided on the top bar of frame 2 and is adapted to engage the half of split pivot 5 that may be raised, as shown in Fig. I.

9 designates means on the cake-holder adapted to be engaged by a suitable handle or hook to turn the cake-holder.

The cooking vessel or kettle 10 is desirably rectangular in shape, so that the rotatable cake-holder works closely therein, and is provided in each end with a way or grooved guide 11 to receive and guide the vertical bars 22 of frame 2, the said frame being insertible in and removable from the said ways to enable the cake-holder to be put into or taken out of the cooking vessel. The ends of the cooking vessel are desirably formed flat or in an even plane, as shown, and the ways or grooves 11 are formed as recesses in such flat planes. The cooking vessel, which is desirably formed of sheet metal, is bent outward at each end to form the outside wall of the vessel, the bent outside wall portion 12 extending externally to the way 11 and forming a backing therefor, while bridge-pieces 13, extending from the edges of the way 11 to the inner wall of the end of the vessel on each side of the outward bend thereof, serve both to brace or support such way and to continue the flat or even surfaces of the inner walls of the vessel. Openings 14 are provided at the bottom of bridge-plates 13 at one end of the vessel, establishing communication between the space back of said bridge-plates and the main body of the cooking vessel. Said openings are shown as formed by leaving a space between the bottom of the plates 13 and bottom of vessel 10. A bead 15, extending around the top of the cooking vessel, is bent out at the ends to correspond with the enlargement or swell of such ends, and the tops of bridge-plates 13 are correspondingly bent out, forming ledges 16, and holes or perforations 17 are provided in such wide portion of the bead at one end of the vessel communicating with the space 23 between the bridge-plates 13 and the outer wall of the ends of the vessel.

The tray or pan 18 is adapted to rest by one edge on the extended bead or ledge 16 and has two downwardly-extending nipples or pipes 19, adapted to enter the holes 17 aforesaid and attach the inner end of the tray to the kettle. Tray 18 is provided with brackets or braces 20 attached thereto and extending outward to engage with the end of the cooking vessel 10 to properly support the tray. The tray is thus supported in slightly-inclined position, so that any fluid thereon will flow toward its inner end and down through the nipples 18 and passage 23 between the outer and inner walls 12 13, and so down into the bottom of the cooking vessel. A flange 21 around the edge of tray 17 serves to prevent any fluid from running over the edge of the tray. The edge of the tray is inset at 24 for the passage of frame-bar 22.

Two of the cake-holders and supporting-frames therefor will desirably be provided for each cooking vessel, so that while one is in use for cooking doughnuts or other articles the other can be set to one side for emptying and refilling.

In using the device the cake-holder is opened by lifting up the upper member and catching it to the top frame and the lower member then filled with the doughnuts. The frame with the holder is then inserted into the cooking vessel to bring the doughnuts below the surface of the oil and the upper member is then shut down to hold the doughnuts in place. When the doughnuts have been cooked on one side, the frame is lifted by a handle 25 sufficiently to permit the doughnut-holder 1 to be inverted, as described in my previous patent, and is again lowered in position to permit the other side of the doughnuts to be browned. Then the frame with the doughnut-holder is removed bodily from the cooking vessel and is placed on the drainage-tray 18, the surplus oil or grease then running from the doughnuts, the holder, and the frame onto the tray and down through the ducts or nipples 19 into the passage 23, and so back to the main body of oil in the cooking vessel. Any waste of oil or grease is thus avoided and the inconvenience of having to turn back the oil or grease from time to time to the cooking vessel is also done away with. When the doughnut-holder is thus placed upon the tray, it is preferably in open position, and the doughnuts are removed therefrom and a new supply inserted, the holder and its supporting-frame being then replaced within the cooking vessel. In using two frames and holders a second one will be filled while the first one is in the cooking vessel and will be placed in said vessel as soon as the first is removed therefrom. Owing to the fact that the tray 18 is supported wholly on the tank or vessel 10, the device may be turned or moved to different positions with less effort than would be the case were the tray provided with independent supports.

When the device is to be put away for a time, the tray may be detached by simply lifting it up and may then be placed on top of the cooking vessel to serve as a cover therefor.

What I claim, and desire to secure by Letters Patent of the United States, is—

1. A device of the character described, comprising a cooking vessel and a cake-holder, means for removably supporting the cake-holder in the vessel, a drainage-tray attached to and communicating with said vessel and adapted to support the cake-holder and supporting means, when removed from the cooking vessel.

2. A device of the character described, comprising a cooking vessel, a cake-holder having means for removably supporting it in the vessel, and a tray removably attached to and communicating with said vessel and adapted to support the cake-holder when removed from the cooking vessel.

3. A cooking vessel for the purpose described, having a passage formed in one end and a ledge above said passage, and a tray resting at one end on said ledge and communicating with said passage.

4. A cooking vessel for the purpose described, having an outwardly-bent wall, a groove-formed way attached to said end wall, and bridge-pieces between the edges of the way and the end wall and extending in a plane with the body of the end wall, in combination with a cake-holder rotatably supported in said vessel and a frame adapted to slide in said way and provided with pivotal supports for said cake-holder.

5. A cooking vessel for the purpose described, having a flat inner end wall portion and a bent outer wall portion, a grooved guide-piece extending between such wall portions and open in front and a ledge formed at the top of, and connecting such wall portions.

6. A cooking vessel for the purpose described, provided with a passage at its end and a ledge at the top of said passage, and a drainage-tray resting on said ledge and having a nipple communicating with said passage.

7. A cooking vessel and a drainage-tray attached thereto at one end, said tray being provided with braces extending obliquely downward to engage the wall of the vessel and with downwardly-extending hollow retaining members adapted to engage with the top of the vessel to hold the tray in place and also to permit the escape of liquid from the tray into the vessel.

8. A cooking vessel for the purpose described, provided with outer and inner walls at the end, with an intervening passage communicating with the body of the vessel, a ledge at the top of said passage having openings into said passage and connecting the outer and inner walls, in combination with a tray, adapted to rest on said ledge and having nipples entering said openings and establishing communication from the top of said tray into said passage.

9. A cooking vessel for the purpose described, provided with outer and inner walls at its end, with an intervening passage communicating with the body of the vessel, a ledge at the top of said passage having openings into said passage and connecting the outer and inner walls, in combination with a tray, adapted to rest on said ledge and having nipples entering said openings and establishing communication from the top of said tray into said passage, and braces extending from said tray to contact with the cooking vessel.

In witness whereof I have hereunto set my hand, in the presence of two witnesses, this 22d day of August, 1903.

JOHN KORBEL.

Witnesses:
A. P. KNIGHT,
JULIA TOWNSEND.